(12) United States Patent
Gozzini

(10) Patent No.: US 6,927,581 B2
(45) Date of Patent: *Aug. 9, 2005

(54) SENSING ELEMENT ARRANGEMENT FOR A FINGERPRINT SENSOR

(75) Inventor: Giovanni Gozzini, Berkeley, CA (US)

(73) Assignee: UPEK, Inc., Emeryville, CA (US)

( * ) Notice: Subject to any disclaimer, the term of this patent is extended or adjusted under 35 U.S.C. 154(b) by 602 days.

This patent is subject to a terminal disclaimer.

(21) Appl. No.: 09/997,549

(22) Filed: Nov. 27, 2001

(65) Prior Publication Data

US 2003/0099380 A1 May 29, 2003

(51) Int. Cl.[7] .............................................. G01R 27/26
(52) U.S. Cl. ...................................... 324/663; 324/690
(58) Field of Search ................. 324/663, 662, 324/671, 690, 686; 382/124

(56) References Cited

U.S. PATENT DOCUMENTS

| | | | |
|---|---|---|---|
| 4,429,413 A | * | 1/1984 | Edwards ..................... 382/124 |
| 5,963,679 A | * | 10/1999 | Setlak ........................ 382/312 |
| 6,114,862 A | | 9/2000 | Tartagni et al. .............. 324/662 |
| 6,326,227 B1 | | 12/2001 | Thomas et al. ............... 438/48 |
| 6,346,739 B1 | | 2/2002 | Lepert et al. ................ 257/532 |
| 6,437,583 B1 | * | 8/2002 | Tartagni et al. .............. 324/687 |
| 6,636,053 B1 | * | 10/2003 | Gozzini ....................... 324/658 |
| 2003/0102874 A1 | * | 6/2003 | Lane et al. .................. 324/662 |
| 2004/0239355 A1 | * | 12/2004 | Kazama ....................... 324/761 |

* cited by examiner

*Primary Examiner*—Anjan Deb
(74) *Attorney, Agent, or Firm*—DLA Piper Rudnick Gray Cary US LLP; Andrew V. Smith

(57) ABSTRACT

For each pixel in an array of pixels in a fingerprint sensor, a fingerprint capacitor is defined by the fingerprint-bearing skin of a user's finger proximate to the top exposed surface of a sensing plate of the pixel. First and second plates are embedded in dielectric material beneath the sensing plate, and define therewith first and second capacitors of a sensing element. The capacitance of the fingerprint capacitor is coupled by the sensing element to an amplifier. During a sensing operation, the amplifier generates a pixel output signal that is a function of the variable capacitance of the fingerprint capacitor, which varies according to the presence of a fingerprint ridge or valley appearing directly above the sensing plate when the user's finger is in contact with the fingerprint sensor.

7 Claims, 6 Drawing Sheets

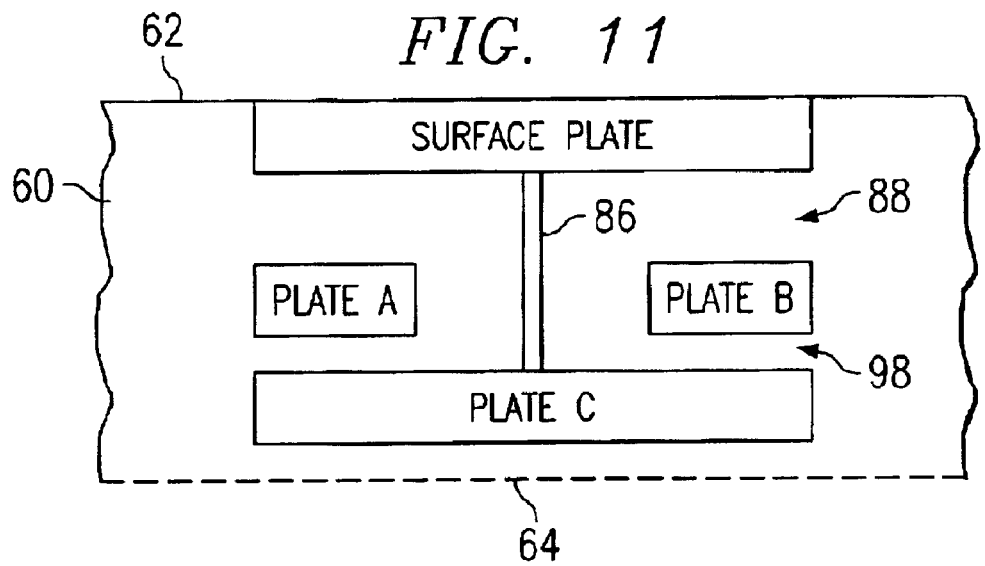
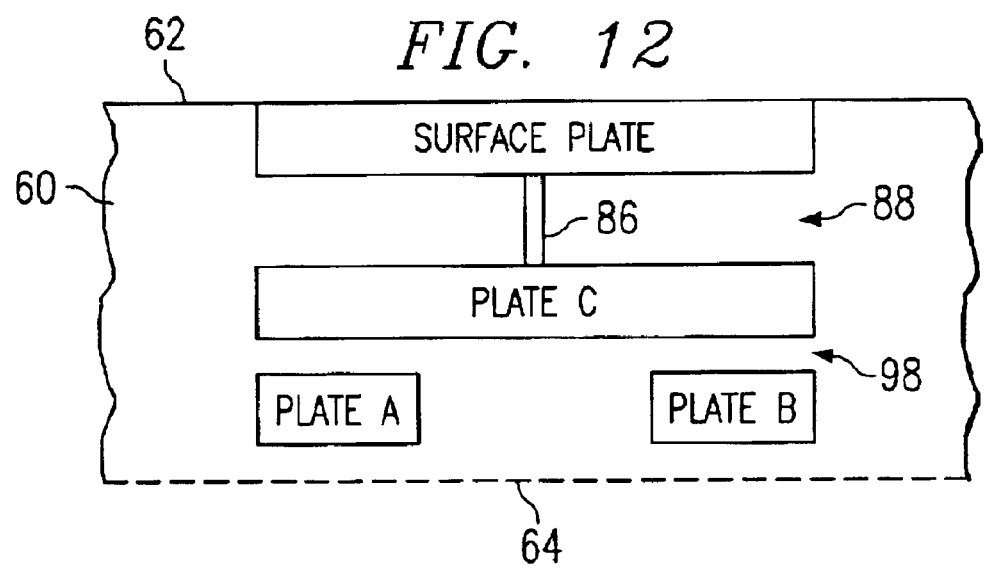

SENSING ELEMENT ARRANGEMENT FOR A FINGERPRINT SENSOR

BACKGROUND OF THE INVENTION

The present invention relates generally to capacitive fingerprint sensors, and more particularly to improvements in the structure of sensing elements that capacitively interact with the fingerprint-bearing skin of a user's finger.

A capacitive distance sensor is disclosed in commonly-assigned U.S. Pat. No. 6,114,862 by Tartagni et al., the disclosure of which is hereby incorporated by reference. The Tartagni et al. patent discloses the basic structure and operation of a conventional solid-state fingerprint sensor that is formed on a single semiconductor chip. FIGS. 1 and 2 herein correspond to FIGS. 1 and 4 of the Tartagni et al. patent, and are briefly described below to facilitate an understanding of the application of the present invention in the context of a two-dimensional fingerprint sensor array.

The present invention provides an improvement in the capacitive sensing element that is replicated in each of the sensor cells or "pixels" that are included in a two-dimensional array of sensor cells. Several embodiments of the improved sensing element are described.

SUMMARY OF THE INVENTION

An improved sensing element for a capacitive fingerprint sensor includes capacitor plates at multiple levels separated by dielectric material, the plates including a surface plate disposed on a top surface of a composite dielectric body, and spaced first and second plates disposed beneath the surface plate and separated therefrom by portions of the composite dielectric body. The surface plate and the adjacent top surface portions of the composite dielectric body define a sensing surface to which the fingerprint-bearing skin of a user's finger is applied during a sensing operation. The surface plate and proximate skin, which may be either a fingerprint ridge or valley, together define a fingerprint capacitor. The surface plate and underlying first and second plates define respective first and second capacitors. These two capacitors are interconnected with active circuit elements that generate a pixel output signal, which is a function of the variable capacitance of the fingerprint capacitor.

BRIEF DESCRIPTION OF THE DRAWINGS

FIGS. 9–12 are schematic cross sections of alternative embodiments of sensing elements according to the invention, showing a surface capacitor plate and capacitor plates embedded therebelow in dielectric material;

DESCRIPTION OF THE PRIOR ART

Figure 1:
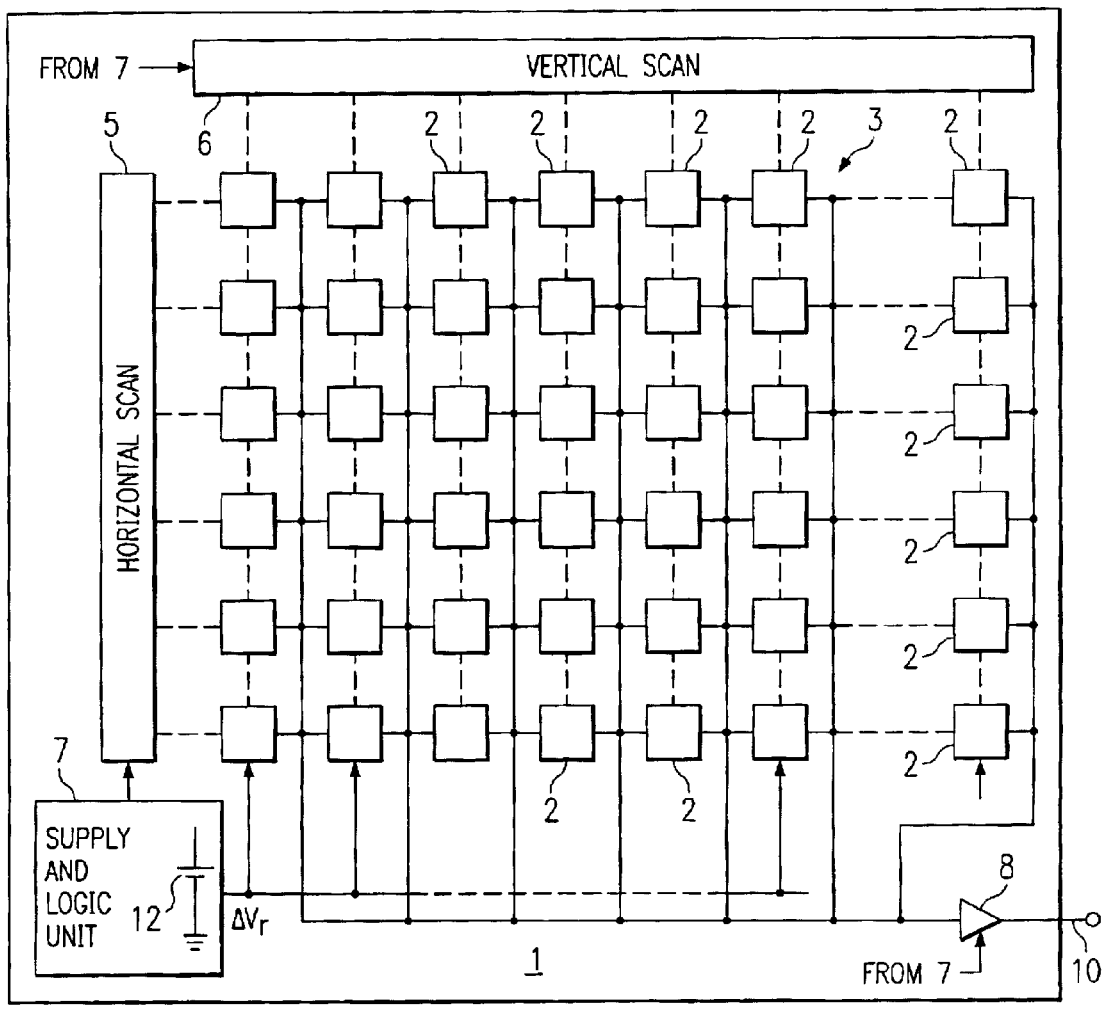
FIG. 1 is a block diagram of a prior art fingerprint sensor over which the present invention provides an improvement.

FIG. 1 shows a layout for prior art sensor device 1 for sensing a distance between a sensing surface of the device and the fingerprint-bearing skin of a user's finger. The sensor device 1 includes a number of cells 2 arranged to form an array 3, each cell constituting an elementary sensor or pixel. The simplicity of the individual cells 2 enables the sensor device 1 to be implemented in integrated form on a single semiconductor chip.

The sensor device 1 also comprises a horizontal scanning stage 5 and a vertical scanning stage 6 for enabling one of the cells 2 at a time according to a predetermined scanning pattern. The stages 5 and 6 enable the outputs of the cells to be read using shift registers, address decoders, or other suitable circuitry.

The sensor device 1 also comprises a supply and logic unit 7, which supplies the circuit elements of the device with power (including the cells 2), feeds the necessary reference voltages, and controls the timing of device operations. FIG. 1 shows that the supply and logic unit 7 includes a voltage source 12. A buffer 8 is interconnected with the outputs of all the cells 2, and includes an output 10 for sequentially generating signals corresponding to the outputs of the cells 2 according to the sequence in which they are enabled by scanning the stages 5, 6.

Figure 2:
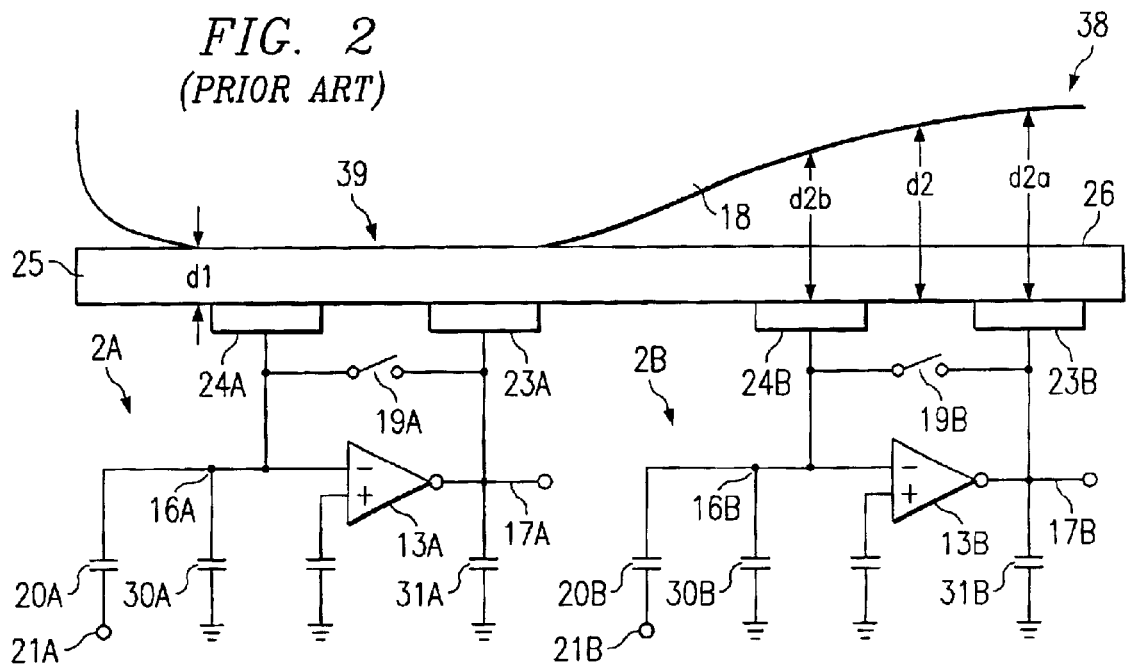
FIG. 2 is an enlarged schematic cross section of a small portion of a finger positioned above two adjacent sensor cells of the device of FIG. 1.

FIG. 2 shows the details of two adjacent cells 2A and 2B with a skin surface portion 18 of a human finger positioned thereover. The elements of each of these two cells bear the designators A or B but are essentially identical, as will now be described. Each cell 2 preferably comprises a low-power inverting amplifier 13 having an input node 16 and an output node 17, which also defines the output of individual cell 2. Each cell 2 also preferably includes first and second coplanar capacitor plates 23 and 24, positioned facing the skin surface 18 of the finger being printed. The plates 23, 24 are covered with a dielectric layer 25 having a sensing surface 26 that covers the face of the integrated sensor device 1, including the entire array 3 of cells 2. A reset switch 19 is connected between the input node 16 and output node 17 of the inverting amplifier 13. An input capacitor 20 is connected between an input node 21 of the cell 2 and the input node 16 of the inverting amplifier 13. The input node 16 of the inverting amplifier 13 also has a parasitic capacitance depicted by capacitor 30. Likewise, the output node 17 has a parasitic capacitance depicted by capacitor 31.

The skin surface 18 includes a ridge 39 contacting the sensing surface 26 adjacent to the first cell 2A and a valley 38 disposed just above the sensing surface 26 adjacent to the second cell 2B. As a result, the first and second cells 2A, 2B will each produce different capacitive coupling responses in the sensor device 1. Accordingly, the first cell 2A will sense a smaller distance d1, signifying the ridge 39, than the second cell 2B, which senses a larger distance d2, signifying the valley 38. The distance d2 sensed by the second cell 2B will be the average of a distance d2a between the first capacitor plate 23B and the portion of the skin surface 18 directly above the first capacitor plate 23B and a distance d2b between the second capacitor plate 24B and the portion of the skin surface 18 directly above the second capacitor plate 24B. From a lumped-model point of view, this structure realizes a three-capacitor scheme that can sense the difference between a contacting member, a ridge, and a non-contacting member, a valley.

DETAILED DESCRIPTION OF THE INVENTION

The present invention will now be described with reference to FIGS. 3–12, like elements in the various figures being designated by the same reference characters.

Figure 3:
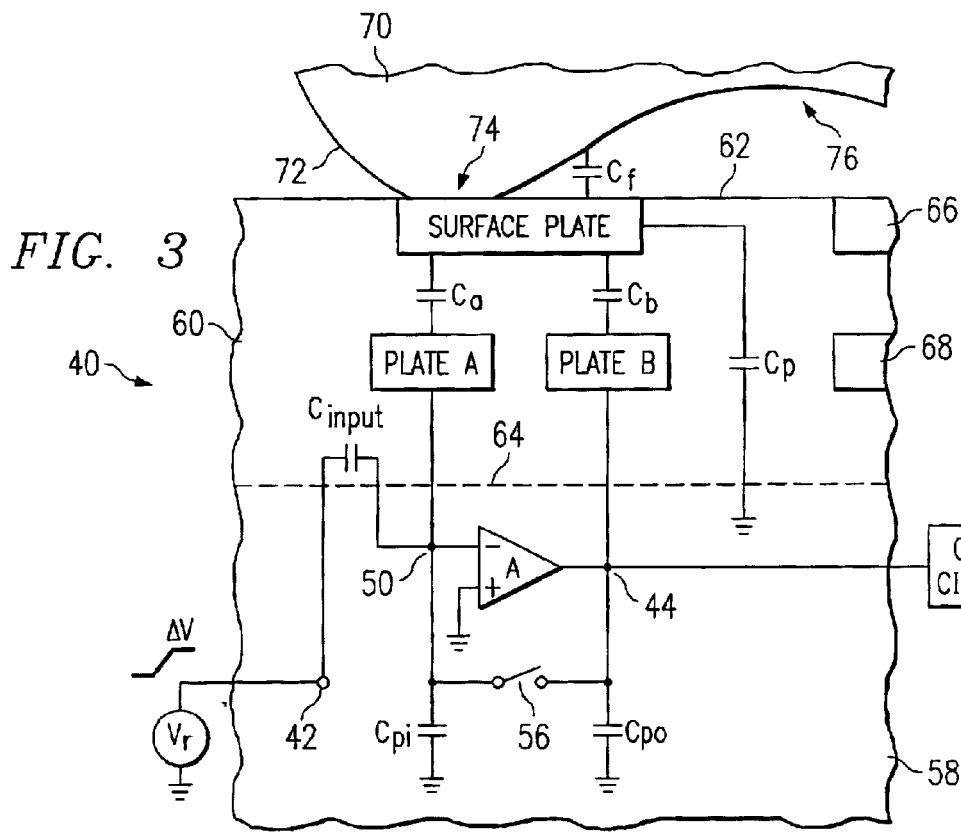
FIG. 3 is an enlarged schematic cross section of a small portion of a finger positioned above a sensor cell, showing capacitor plates in cross section and capacitor symbols superimposed thereon to facilitate an understanding of the functionality of the structural elements in accordance with the invention.

Referring to FIG. 3, one embodiment of a sensor cell or pixel is shown and designated generally by reference numeral 40. Each pixel 40 is typically one of many identical such pixels arranged in a two-dimensional array formed on a semiconductor chip that is the essential component of a solid-state fingerprint sensing device. Pixel 40 has an input node 42 and output node 44. The input node 42 receives a pulsed input signal $\Delta V$ from a reference voltage source $V_r$ during a read operation. The $\Delta V$ input signal preferably is applied to all pixels in a selected column of the pixel array. For example, FIG. 1 shows vertical scanning stage 6 that selects individual columns of the array 3, one column at a time. In FIG. 3, the output node 44 is connected to output circuitry 48 that senses output signals from the pixel 40 periodically.

The output of pixel 40 is generated by an inverting amplifier A such as that described in U.S. Pat. No. 6,114,862. The inverting amplifier A has an input node 50 corresponding to its negative (−) input, and an output node corresponding to the pixel's output node 44. An input capacitor $C_{input}$ interconnects the pixel's input node 42 with the inverting amplifier's input node 50. The inverting amplifier's positive (+) input is connected to a voltage source, such as ground. The ground symbols in the figures may represent the actual ground terminal of the fingerprint sensing device or may represent a virtual ground bus internal to the chip. A parasitic capacitor $C_{pi}$ connects the inverting amplifier's input node 50 to ground, and a parasitic capacitor $C_{po}$ connects the output node 44 to ground. Just prior to a sensing operation, a reset switch 56 is opened to prepare the inverting amplifier A to generate an accurate output signal during the sensing operation. The reset switch 56 may be a conventional transistor, such as an NMOS transistor, and interconnects the inverting amplifier's input node 50 and output node 44.

The active elements just described (i.e., transistor 56 and the inverting amplifier A) are formed in part in a semiconductor substrate 58, which conventionally will have an upper epitaxial layer with isolated active areas formed therein. It will be appreciated that the pixel 40 is a small part of a larger fingerprint sensor that is fabricated as a specialized semiconductor integrated circuit chip. The starting material is typically a monocrystalline silicon wafer large enough to include many identical fingerprint sensors that are eventually separated by slicing the wafer into chips. The individual chip substrate 58 has a composite dielectric body 60 disposed thereon and defining a sensing surface 62 in the finished device. A dashed line 64 schematically indicates a transition from the composite dielectric body 60 to the substrate 58 below.

The composite dielectric body 60 includes multiple layers of dielectric or insulating material that are not shown separately. These dielectric layers may include conventional oxide and nitride layers known to those skilled in the art of semiconductor device fabrication. Within the dielectric body 60 are several levels of conductive layers that are deposited and patterned into separate conductors. Three such conductors are shown in FIG. 3 as part of pixel 40 and are labeled: Surface Plate, Plate A and Plate B. The upper surface of the Surface Plate is flat and is preferably coplanar with surrounding flat surface portions of the dielectric body 60, together defining part of the sensing surface 62. Plate A and Plate B are embedded in the dielectric body 60 beneath the Surface Plate. Known photolithographic patterning techniques may be used to form the plates and various suitable conductive materials may be used. For example, the Surface Plate may consist essentially of tungsten and Plates A and B may consist essentially of aluminum. Similarly-formed plates 66 and 68 of an adjacent pixel are partially shown at the broken-off right edge of the dielectric layer 60.

The Surface Plate is shown contacting a portion of a user's finger 70, which includes fingerprint-bearing skin 72 having a typical fingerprint ridge 74 and fingerprint valley 76. The portion of the skin 72 proximate to the Surface Plate defines a capacitor $C_f$ whose capacitance varies with the proximity of the skin to the Surface Plate. The capacitance of Capacitor $C_f$ is largest when a fingerprint ridge is in contact with the Surface Plate, and is smallest when a fingerprint valley is directly over the Surface Plate.

Plate A and the portion of the Surface Plate juxtaposed thereabove define a first coupling capacitor $C_a$, and Plate B and the portion of the Surface Plate juxtaposed thereabove define a second coupling capacitor $C_b$. A capacitor $C_p$ represents the parasitic capacitance between the Surface Plate and ground. Plate A is connected to the inverting amplifier's input node 50, and Plate B is connected to the inverting amplifier's output node 44.

It will be understood that the circuit elements designated $C_p$, $C_a$ and $C_b$ in FIG. 3 merely show how the finger 70, the Surface Plate, Plate A and Plate B interact electrically; they are not separate structural elements like the plates themselves. Likewise, capacitor $C_p$ in FIG. 3 is parasitic and not a separate structural element. However, capacitor $C_{input}$ is a separate structural element designed to have a particular capacitance value within manufacturing tolerances. Capacitor $C_{input}$ may be formed in any suitable manner, and may comprise, for example, metal plates at two different levels, or a metal plate disposed over a conductive polysilicon layer, or a conductive polysilicon layer disposed over a heavily-doped surface region in the substrate 58.

The capacitance values of capacitors $C_a$ and $C_b$ should be as large as practical to ensure good coupling of the variable capacitance of capacitor $C_f$ across the inverting amplifier A. The space separating the Surface Plate from Plates A and B may be a conventional dielectric material such as silicon nitride or silicon dioxide. Techniques for fabricating such layers are well known in the art. The dielectric material separating the Surface Plate from Plate A and Plate B should be less than 1.0 micron thick, preferably having a thickness of about 0.2 to 0.3 microns.

The transistor elements of the device, including transistor 56 and the transistors that comprise the inverting amplifier A, are formed at the upper surface of the substrate, and typically include polysilicon gate electrodes disposed within the composite dielectric body 60 just above the substrate 58. Because these conventional transistor elements are well known, their structures are not specifically illustrated but are schematically depicted by the circuit diagram superimposed on the cross-sectional face of the substrate 58. It should also be understood that the parasitic capacitances $C_{pi}$ and $C_{po}$ arise from structures that exist in both the substrate 58 and in the dielectric body 60.

When a particular pixel is read, a pulse $\Delta V$ is generated by reference voltage source $V_r$. This pulse is applied to the pixel 40 through the pixel input node 42. The pulse $\Delta V$ propagates through capacitor $C_{input}$ and appears at the input node 50 of the inverting amplifier A. Prior to reading the pixel 40, switch 56 is opened. The inverting amplifier A generates an output signal at its output node 44, which is communicated to the output circuitry 48. The output circuitry digitizes the pixel output signal on node 44 for communication off the chip together with other pixel outputs in sequence for further processing. The analog value of the output signal on output node 44 is determined by the gain of the inverting amplifier A, which is a function of the capacitance in its feedback loop. The series-connected capacitors $C_a$ and $C_b$ define the feedback loop and their combined value is modulated by the capacitance of the fingerprint capacitor $C_f$.

Figure 4:
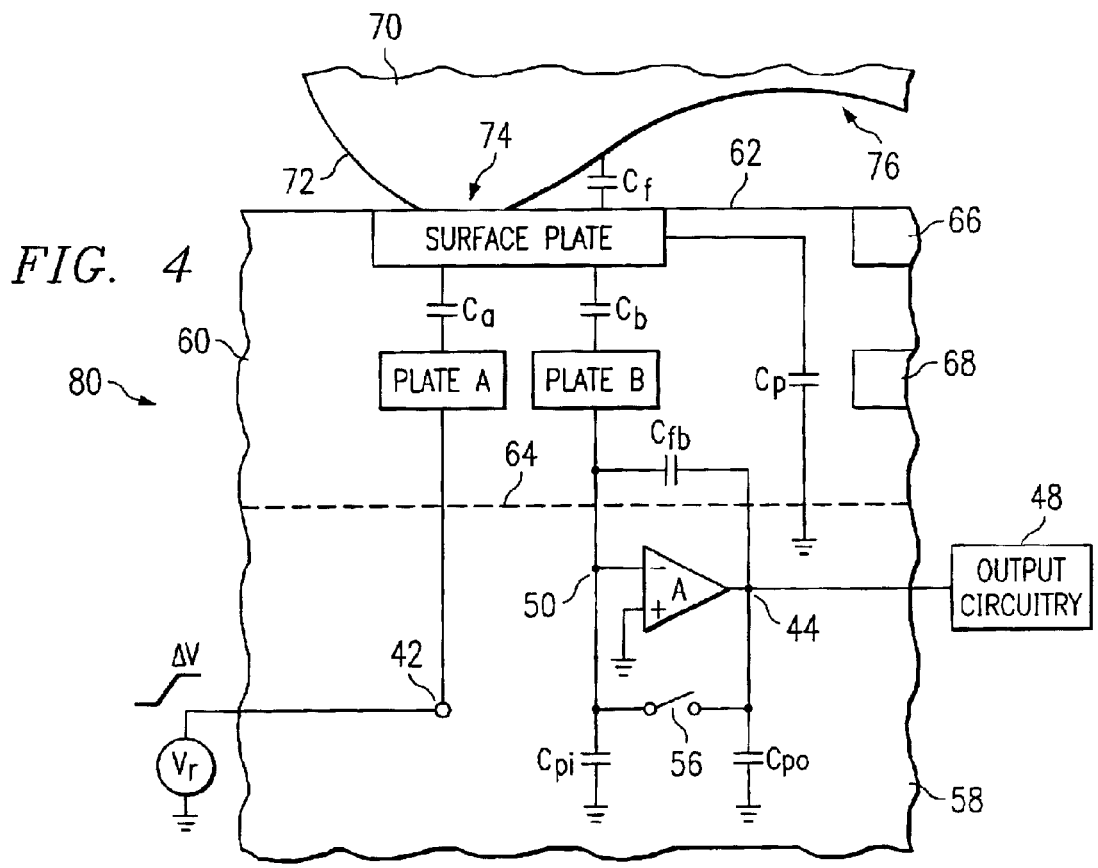
FIG. 4 is an enlarged schematic cross section similar to FIG. 3 showing an alternative circuit arrangement of elements in accordance with the invention.

An alternative circuit arrangement is shown in FIG. 4, the pixel depicted therein being designated by reference numeral 80 to distinguish it from the pixel 40 of FIG. 3. However, like elements are designated by the same reference characters. It will be noted that pixel 80 of FIG. 4 has Plate A connected to the pixel input node 42, and Plate B connected to the input node 50 of the inverting amplifier A. The input capacitor $C_{input}$ of FIG. 3 is eliminated. In the circuit of pixel 80 in FIG. 4, a feedback capacitor $C_{fb}$ is connected across the inverting amplifier's input node 50 and output node 44. The feedback capacitor $C_{fb}$ is designed to have a particular capacitance value within manufacturing tolerances, which affects the gain of inverting amplifier A and causes it to function as a charge integrator. The feedback capacitor $C_{fb}$ may be formed in any suitable manner, and may comprise, for example, metal plates at two different levels, or a metal plate disposed over a conductive polysilicon layer, or a conductive polysilicon layer disposed over a heavily-doped surface region in substrate 58.

Figure 5:
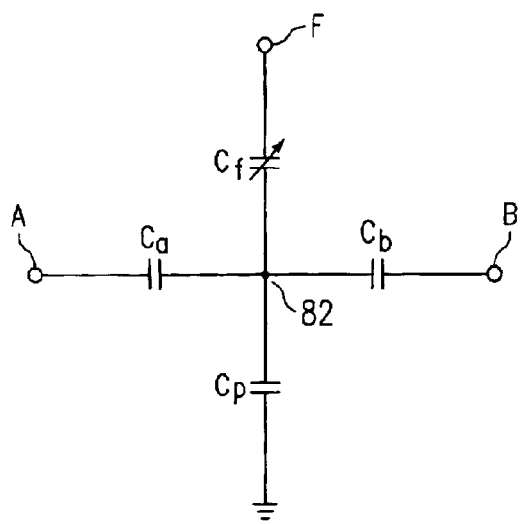
FIG. 5 is a circuit diagram of the capacitors that make up a basic sensing element according to the invention.

In the alternative arrangements of FIGS. 3 and 4, the respective pixels 40 and 80 each have sensing elements defined by four capacitors: $C_a$, $C_b$, $C_f$ and $C_p$. These four capacitors are shown generalized in the FIG. 5 with connecting nodes: A, B, F, and ground. Nodes A and B correspond to Plates A and B in FIGS. 3 and 4. FIG. 5 also shows that capacitors $C_a$ and $C_b$ share a common node 82, which corresponds to the Surface Plate. Node F corresponds to the fingerprint-bearing skin 72, which defines the variable fingerprint capacitor $C_f$ with the Surface Plate. Parasitic capacitor $C_p$ is connected between node 82 and ground.

Figure 6:
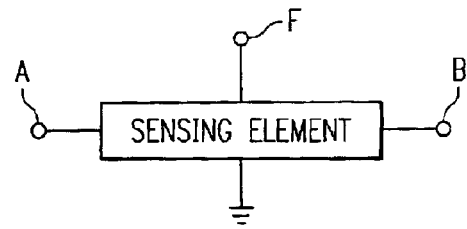
FIG. 6 is a generalized depiction of the sensing element of FIG. 5 showing its nodes that connect with other circuit elements.

FIG. 6 further generalizes the arrangement of the Surface Plate and Plates A and B and the capacitors they define. By comparison with FIG. 5, FIG. 6 depicts a generalized Sensing Element corresponding to capacitors $C_a$, $C_b$, $C_f$, and $C_p$ showing only the connecting nodes: A, B, F, and ground.

Figure 7:
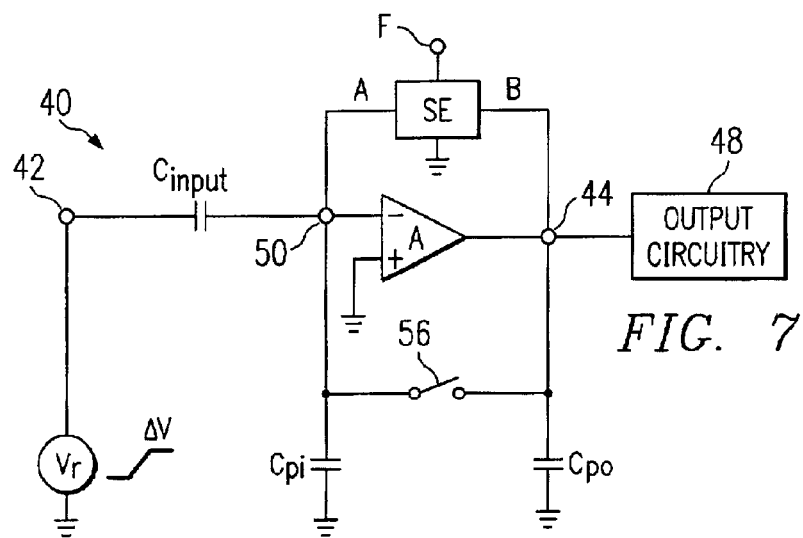
FIG. 7 is a circuit diagram corresponding to FIG. 3 showing one of two alternative circuits according to the invention.
Figure 8:
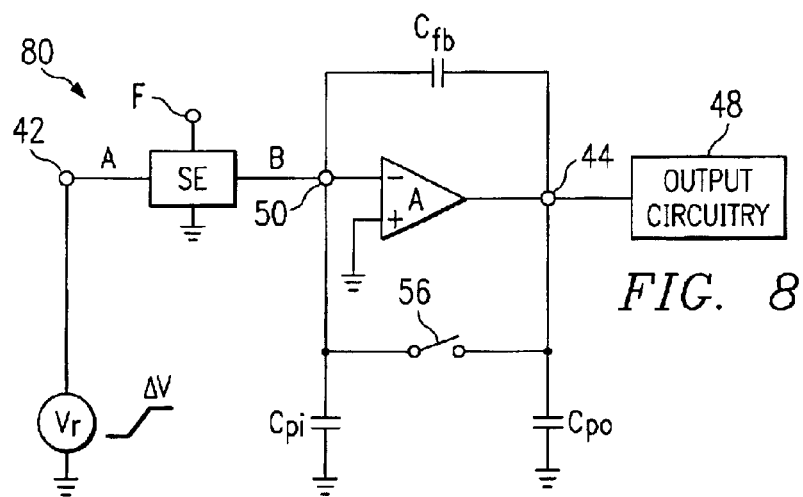
FIG. 8 is a circuit diagram similar to FIG. 7 and corresponding to FIG. 4 showing the other of two alternative circuits.

FIG. 7 is a simplified circuit diagram corresponding to the pixel 40 of FIG. 3, and FIG. 8 is a simplified circuit diagram corresponding to the pixel 80 of FIG. 4, both figures using the generalized Sensing Element of FIG. 6, designated SE. FIGS. 7 and 8 show alternative circuit applications for the Sensing Element embodiments of the present invention. In FIG. 7 the Sensing Element SE is connected in the feedback loop of the inverting amplifier A, whereas in FIG. 8 the Sensing Element SE is in the input path between the pixel's input node 42 and the inverting amplifier's input node 50. Various embodiments of the inventive Sensing Element of the present invention will now be described in conjunction with FIGS. 9–12.

Figure 9:
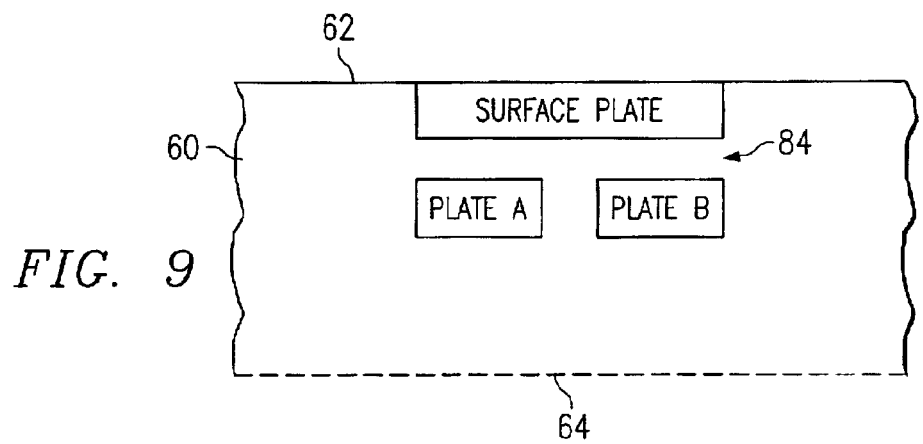

Referring to FIG. 9, a basic form of the Sensing Element useful in either pixel 40 or 80 is shown in schematic cross section. Only the upper dielectric portion 60 of the pixel is shown. The substrate (not shown) will be understood to be below the dashed line 64. In this embodiment, it is important for the dielectric material 84 separating the Surface Plate from Plates A and B therebelow to have a minimum practical thickness. Preferably, the separating dielectric 84 should be about 0.2 to 0.3 microns thick. A minimum practical thickness for the separating dielectric 84 maximizes the capacitive coupling between the Surface Plate and Plates A and B therebelow.

Figure 10:
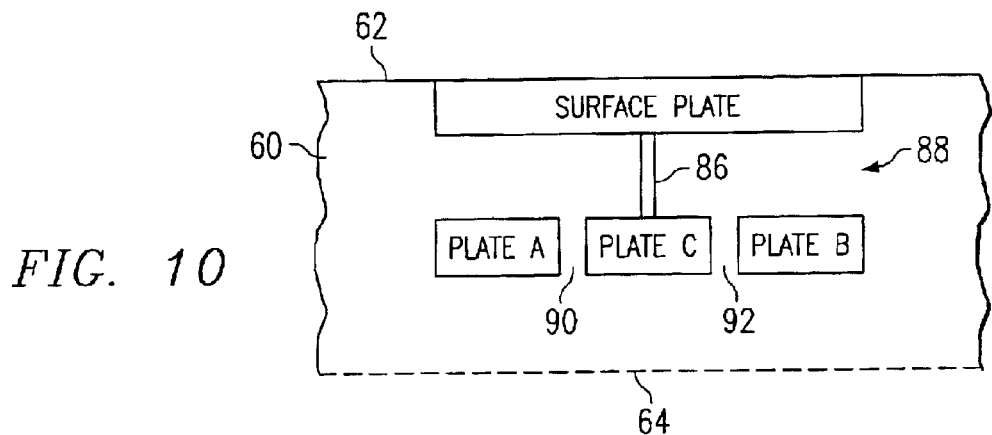

Referring to FIG. 10, an alternative embodiment of the inventive Sensing Element is shown in which an additional Plate C has been laterally interposed between Plates A and B. Plate C is connected to the Surface Plate by a conductor 86, such as a metal via. This permits use of a much thicker dielectric body portion 88 separating the Surface Plate from the plates therebelow. For example, dielectric body portion 88 can be greater than ten microns thick and preferably is from 15 to 20 microns thick. Plates A, B and C are coplanar and have dielectric spacers 90 and 92 separating the edges of Plate C from the respective opposed edges of Plates A and B, as shown. Plates A, B and C can be etched from the same conductive layer, such as an aluminum metalization, cutting 1.0 micron gaps therein to define the separate plates. Thus, the capacitors $C_a$ and $C_b$ of FIG. 5 are formed between the facing edges of the embedded Plates A, B and C. This effect is illustrated more clearly by FIG. 10A.

Figure 10A:
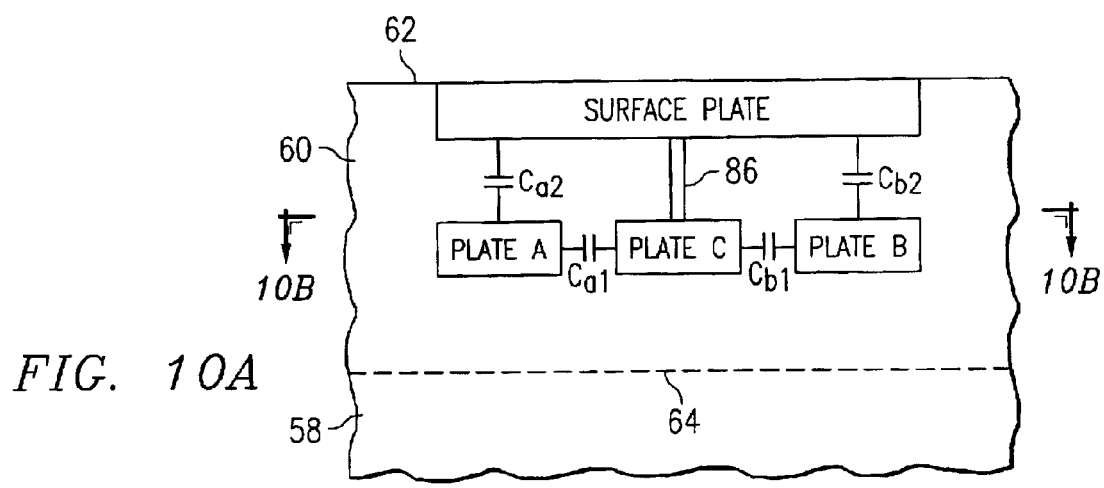
FIG. 10A is an alternate view of the structure of FIG. 10 showing electrical circuit elements overlaid on the cross-sectional plate structure.

In FIG. 10A, a capacitor $C_{a1}$ is formed between Plate A and Plate C, and a capacitor $C_{a2}$ is formed between Plate A and the Surface Plate. If the thickness of the dielectric material separating the Surface Plate from Plate A (preferably from 15 to 20 microns) is very much greater than the thickness of the dielectric material separating Plate A from Plate C (preferably 1.0 micron), capacitor $C_{a1}$ can be made larger than capacitor $C_{a2}$. Similarly, capacitor $C_{b1}$ formed between Plate B and Plate C can be made larger than capacitor $C_{a2}$. It will be appreciated that the layouts of the Surface Plate and embedded Plates A, B and C can be designed to insure that capacitors $C_{a2}$ and $C_{b2}$ are negligible relative to capacitors $C_{a1}$ and $C_{b1}$. One such layout is depicted in FIG. 10B.

Figure 10B:
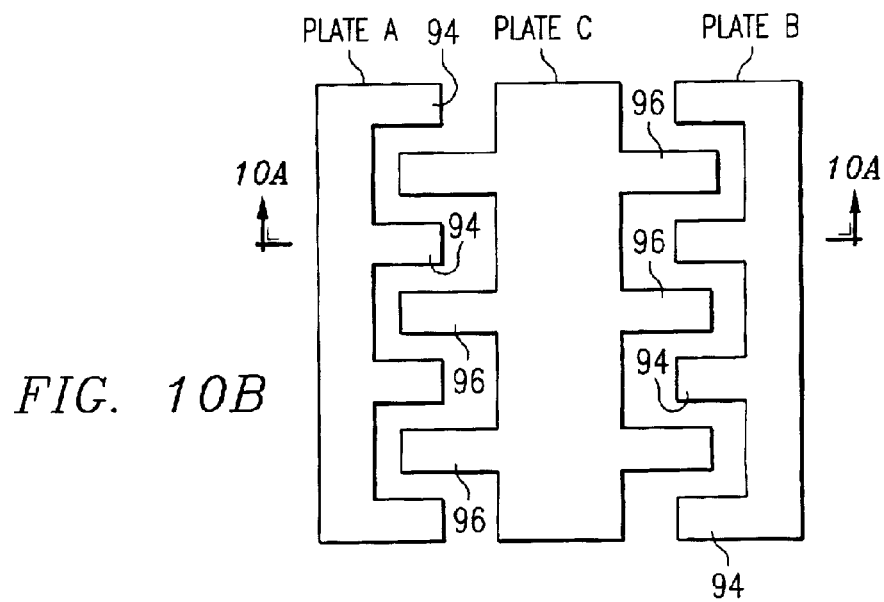
FIG. 10B is a plan view of an interdigitated layout of the embedded capacitor plates of FIG. 10A.

FIG. 10B shows an interdigitated arrangement for Plates A, B and C of FIG. 10A. Plates A and B have inwardly extending fingers 94 and Plate C has outwardly extending fingers 96, as the plan view layout of FIG. 10B shows. The multiple interdigitated fingers 94 and 96 form the facing edges that define the capacitors $C_{a1}$ and $C_{b1}$ of FIG. 10A. Such an interdigitated arrangement greatly increases the capacitance of capacitors $C_{a1}$ and $C_{b1}$, since the shared area of the respective capacitor plates is dramatically increased.

The layout of FIG. 10B is just one of many possible alternatives that can increase the capacitance between adjacent plates within the limits of a pixel's dimensions. For example, FIG. 8 of Tartagni et al. U.S. Pat. No. 6,114,862 shows a C-shaped plate and a complementary adjacent plate arrangement that can be converted into three adjacent plates by replicating a mirror-image layout of the two adjacent plates. The result is easily envisioned as a C-shaped plate on the left, a mirror-imaged C-shaped plate on the right, and a center plate therebetween, the center plate having a common bar-shaped portion in the middle and extensions through the C-shaped gaps to adjoining dumbbell-shaped ends within the C-shaped plates. The extensions and dumbbell-shaped ends are like two oppositely oriented fingers 96 of the interdigitated layout of FIG. 10B and serve the same capacitive enhancing function in a similar way.

Referring again to FIGS. 9 and 10, it will be appreciated that the plate arrangement of FIG. 10 permits use of a very thick dielectric portion 88 separating the Surface Plate from the lower embedded plates compared to the relatively thin separating dielectric portion 84 required by the arrangement of FIG. 9. This is made possible by including Plate C in the arrangement of FIG. 10 and interconnecting it with the Surface Plate using conductor 86. Note also that the Surface Plate need not be juxtaposed directly over Plates A and B. The formation of capacitors $C_a$ and $C_b$ using embedded Plate C connected to the Surface Plate allows one to decouple the layout geometry of the Surface Plate from the embedded plates therebelow. This is also true of the structures of FIGS. 11 and 12. The thick dielectric portion 88 may be a hard glass material that can be deposited using conventional CVD techniques. Also, a thin silicon nitride or oxynitride layer can be used atop a thicker glass layer, which together can form the thick dielectric portion 88.

FIGS. 11 and 12 show additional embodiments of the inventive Sensing Element using different arrangements of lower embedded plates. These two arrangements use three levels of conductors. The embedded lower level plates in FIGS. 11 and 12 can consist essentially of aluminum or can comprise other suitable conductive materials.

In FIG. 11, Plate C is included beneath Plates A and B. Plate C is connected to the Surface Plate by conductor 86. The dielectric material portion 88 separating the Surface Plate form the underlying Plates A and B can be relatively thick, while a relatively thin dielectric material portion or layer 98 separates Plate C from Plates A and B. Therefore, capacitors $C_a$ and $C_b$ of FIG. 5 are effectively formed between Plate C and Plates A and B, respectively.

FIG. 12 shows an arrangement similar to FIG. 11 with Plate C in this case located in the second level and Plates A and B located in the third level of conductive plates. Again, Plate C is connected to the Surface Plate by conductor 86 so that the dielectric material 88 can be made very thick while the dielectric material 98 is made relatively thin. In FIGS. 11 and 12, dielectric material 98 should be less than 1.0 micron thick and preferably is from 0.2 to 0.3 micron thick, whereas dielectric material 88 should be greater than 10.0 microns thick and preferably is from 15 to 20 microns thick.

It will be appreciated that various additional sensor element structures can be envisioned from the foregoing description. Features from FIGS. 10–12 can be combined to further improve capacitive coupling, or to facilitate layout-related or process-related design requirements. For example, Plate C in FIG. 11 or 12 can include an additional common plate lying coplanar with Plates A and B and interposed therebetween in the manner of Plate C of FIG. 10.

Moreover, other materials than those described herein can be employed. For example, the Surface Plate can be formed from a titanium oxide film rather than tungsten. Additionally, composite conductive layers can be used. For example, in the structure of FIG. 12, Plate C can be formed by a layer of titanium oxide atop a layer of aluminum, and Plates A and B can be aluminum or can be formed from a conventional conductive polysilicon layer, such as silicided polysilicon.

Although preferred embodiments have been described in detail, it should be understood that various changes, substitutions and alterations can be made therein without departing from the spirit and scope of the invention as defined by the appended claims.

What is claimed is:

1. A sensing element for a capacitive sensor, comprising:
   a body of dielectric material;
   a surface plate disposed on the dielectric body, the surface plate having an upper surface defining a portion of a sensing surface of the capacitive sensor;
   first and second plates separated from each other and from the surface plate by portions of the dielectric body;
   a third plate separated from the surface plate, the first plate and the second plate by portions of the dielectric body; and
   a conductor connecting the third plate to the surface plate;
   wherein the first plate defines a first capacitor with the third plate, and wherein the second plate defines a second capacitor with the third plate, the first and second capacitors being connected in series in a circuit within the capacitive sensor for communicating a signal therein that is a function of a variable capacitance sensed at the upper surface of the surface plate.

2. The sensing element of claim 1 wherein the first, second and third plates are each embedded in the dielectric body a like distance beneath the surface plate, the third plate lying between and adjacent to the first and second plates, the first capacitor being defined by respective facing edges of the first and third plates, the second capacitor being defined by respective facing edges of the second and third plates.

3. The sensing element of claim 2 wherein the first and second plates have fingers extending toward the third plate, and the third plate has fingers extending toward the first and second plates, the fingers of the first plate lying in an interdigitated relationship to adjacent fingers of the third plate and forming the facing edges that define the first capacitor, and the fingers of the second plate lying in an interdigitated relationship to adjacent fingers of the third plate and forming the facing edges that define the second capacitor.

4. The sensing element of claim 1 wherein the first and second plates are embedded in the dielectric body beneath the surface plate and separated therefrom by a first thickness of dielectric material, and the third plate is disposed beneath the first and second plates and separated therefrom by a second thickness of dielectric material, the first thickness being greater than ten microns and the second thickness being less than one micron.

5. The sensing element of claim 1 wherein the third plate is embedded in the dielectric body beneath the surface plate and separated therefrom by a first thickness of dielectric material, and the first and second plates are disposed beneath the third plate and separated therefrom by a second thickness of dielectric material, the first thickness being greater than ten microns and the second thickness being less than one micron.

6. The sensing element of claim 1 wherein the first, second and third plates consist essentially of aluminum embedded in the dielectric body.

7. The sensing element of claim 1 wherein the surface plate consists essentially of titanium oxide.

* * * * *